O. WAIT.
SELF PROPELLED PLOW.
APPLICATION FILED FEB. 23, 1909. RENEWED APR. 19, 1910.

975,305.

Patented Nov. 8, 1910.

2 SHEETS—SHEET 1.

Witnesses
F. E. Maynard
R. L. Stevens

Inventor:
Orlin Wait,
By Geo. H. Strong.
his atty.

O. WAIT.
SELF PROPELLED PLOW.
APPLICATION FILED FEB. 23, 1909. RENEWED APR. 19, 1910.

975,305.

Patented Nov. 8, 1910.

2 SHEETS—SHEET 2.

Witnesses;
F. E. Maynard.
R. L. Stevens

Inventor;
Orlin Wait
By Geo. H. Strong.
his Atty.

UNITED STATES PATENT OFFICE.

ORLIN WAIT, OF SAN JOSE, CALIFORNIA.

SELF-PROPELLED PLOW.

975,305.	Specification of Letters Patent.	Patented Nov. 8, 1910.

Application filed February 23, 1909, Serial No. 479,368. Renewed April 19, 1910. Serial No. 556,397.

*To all whom it may concern:*

Be it known that I, ORLIN WAIT, citizen of the United States, residing at San Jose, in the county of Santa Clara and State of California, have invented new and useful Improvements in Self-Propelled Plows, of which the following is a specification.

This invention relates to agricultural implements, and pertains particularly to self-propelled plows.

Among the several purposes of this invention, an important object is to devise an automobile plow adapted to be used on all sorts of ground, whether rolling, hilly or level, which may be steered with great facility, and which shall have various novel and useful features as hereinafter pointed out.

The invention consists of the parts and the construction and combination of parts, or their equivalents, as hereinafter more fully described and claimed, having reference to the accompanying drawings, in which—

Figure 1:
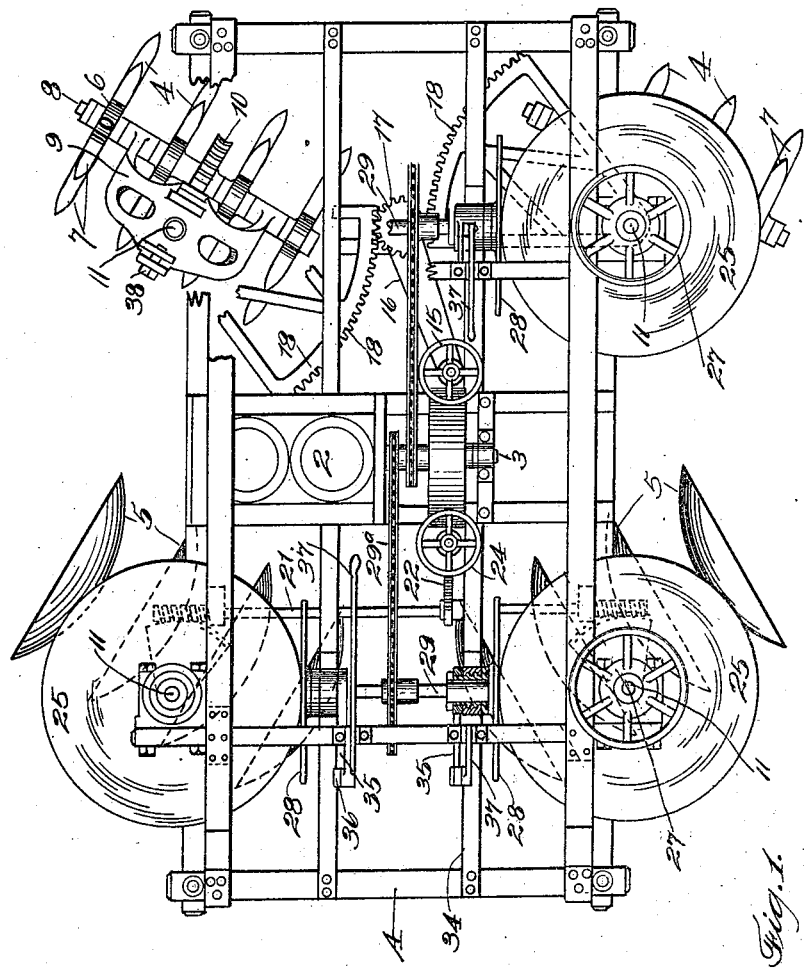
Figure 2:
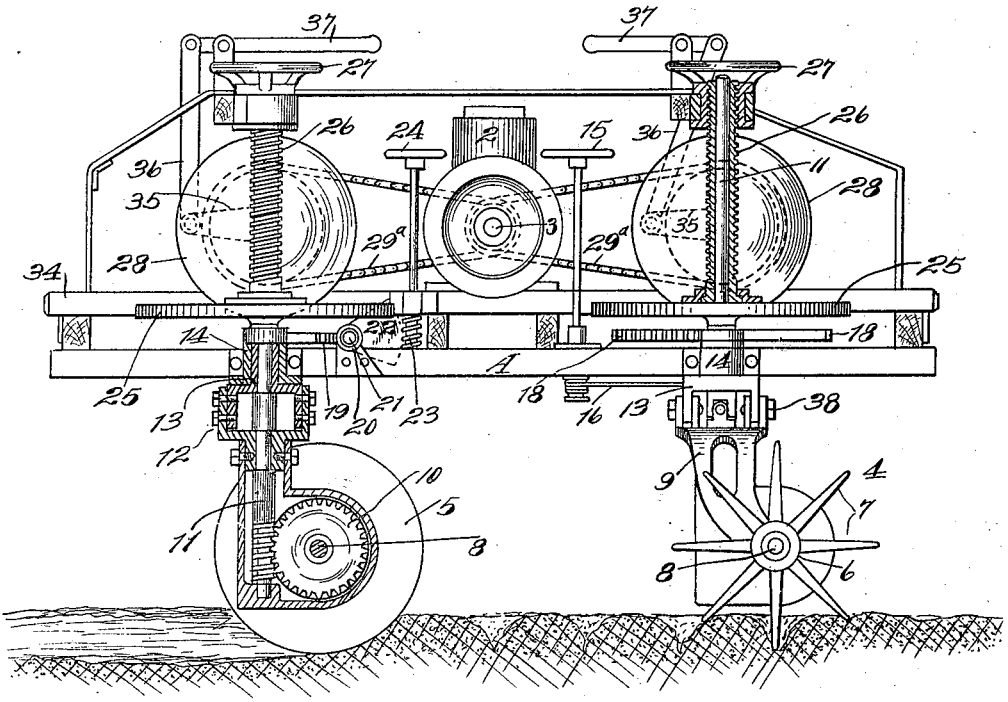
Figure 3:
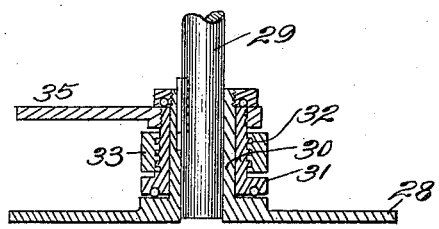

Figure 1 is a plan view of the plow, partially broken away, the hand wheels, 27, of the upper right and left hand gangs being omitted. Fig. 2 is a side elevation, some parts being in section. Fig. 3 is a sectional detail showing the screw bushing and disk.

A is a suitable frame, upon which is mounted a motor 2 of any preferable design, having a shaft 3 from which power is transmitted, by means to be hereinafter described, to the forward rotary diggers 4, and to the disk-plows 5 at the rear of the frame A.

The diggers 4 consist of a hub 6, projecting from which are a plurality of blades or spades 7, and the plows 5 are keyed in sets upon horizontal shafts 8, journaled in hangers 9, and each shaft is provided with a worm-wheel 10 engageable with a vertically disposed worm shaft 11 also journaled in the hanger 9.

The hangers are bolted at 12 to tubular bushings 13, turnable in bearings 14 secured upon the longitudinal side members of the frame A.

The rotary diggers 4 not only serve to help break up the soil by use of the spades 7, but also have the double functions of being steering and traction wheels, each forward shaft-hanger 9 being turnable in unison with its respective bushing 13, by means of a steering-wheel 15 having suitable connections, as cable 16, with a pinion 17 which meshes with rack-segments 18 fastened to the upper end of the bushings 13, and by turning the pinion 17, the racks 18 are caused to move in opposite directions, thereby swinging the steering shafts 8 in unison and parallelism.

Upon the rear plow-shafts 8 I preferably secure disks 5, each shaft being rotated through its worm-wheel 10 and the worm shaft 11, the stem of which is shown as extending upwardly through the bushing 13, and the plow-shafts are adapted to be swung in a horizontal plane, but in opposite directions by means of segments 19, secured to the bushing 13, these segments engaging worms 20 on shaft 21, rockable by a rack 22 and worm 23 when the hand-wheel 24 is turned. By this means the two plow-shafts 8 may be set simultaneously at the desired angle relative to the frame A.

The several vertical worm-shafts 11 are each driven by similar mechanism which, as shown, comprises a friction-disk 25, splined on shaft 11, and adapted for vertical reciprocation, by means of a hollow screw 26 passing through a hand-wheel 27, across the face of a driven, vertical plate 28, slidably carried by shaft 29, two of which are journaled upon frame A, and connected by sprockets and chains 29ª to the engine shaft 3, and each being adapted to carry a pair of the disk-plates 28.

In order to advance or retract the individual driving disks 28, relative to its respective friction-disk 25, its hub 30 is incased in a bushing 31 having exterior threads 32, turnable in the box 33, mounted upon the braces 34 of the frame A, and a lever-arm 35, secured to the bushing 31, is connected by link 36 to a suitable lever 37 which the operator manipulates to advance the bushing 31, and force the disk 28 into driving engagement with the periphery of the horizontal disk 25, thereby driving the worm 11 and worm-wheel 10.

There being one operating lever 37 for each disk 28, the operator may couple or uncouple each driving friction set at will, and the speed and direction of rotation of the disk 25 may be altered as desired by turning the hand-wheel 27; this being effective to raise or lower the disk 25, with the well known result of reducing the speed as the center of the driver 28 is reached, and rotation reversed when it is passed. It is therefore obvious that I have provided a plow which is not only self-propelled, but has many advantages, in that it is perfectly adjustable to meet various conditions of soil and surface; that the spade-carrying members have numerous functions, to wit: as steering-wheels; as traction-wheels, and as disintegrators; it is noticeable too that the rotary spades and the plows may be driven at different relative speeds, which is an important advantage in working certain classes of soils.

In order that the forward diggers may adapt themselves to any inequalities in the ground, the brackets which carry them are pivoted to the forward turnable bushings 13, as at 38.

Having thus described my invention, what I claim and desire to secure by Letters Patent is—

1. The combination in a plow, of a plurality of independent, vertical shafts, disintegrating members and connections between the same and said shafts, a frame supporting a motor, and means whereby said shafts may be separately coupled to and driven by said motor, said means including driving friction disks, driven friction disks splined on said shafts, and means for moving the driving disks into and out of connection with the driven disks.

2. In an apparatus of the character described, a pair of independent steering shafts carrying suitable wheels, a supporting frame, shafts upon which are secured disintegrating members, a hand-wheel, connections between the hand-wheel and the steering-shafts whereby the latter may be adjusted, a motor carried upon the frame, countershafts connected to said motor, and means by which the steering-shafts and the shafts carrying the disintegrating members may be independently driven at various speeds by said countershafts, said last-named means including friction disks driven from the motor, vertical shafts, disks on the vertical shafts engaged by the first named disks, and means for vertically moving the second-named disks relatively to the first-named disks.

In testimony whereof I have hereunto set my hand in presence of two subscribing witnesses.

ORLIN WAIT.

Witnesses:
 CHARLES A. PENFIELD,
 G. A. WHITEHURST.